(12) United States Patent
Kawasaki

(10) Patent No.: US 7,860,363 B2
(45) Date of Patent: Dec. 28, 2010

(54) OPTICAL CONNECTOR KIT

(75) Inventor: Yasunari Kawasaki, Matsudo (JP)

(73) Assignee: Seikoh Giken Co., Ltd., Matsudo-shi (JP)

( * ) Notice: Subject to any disclaimer, the term of this patent is extended or adjusted under 35 U.S.C. 154(b) by 50 days.

(21) Appl. No.: 12/207,796

(22) Filed: Sep. 10, 2008

(65) Prior Publication Data

US 2009/0074360 A1    Mar. 19, 2009

(30) Foreign Application Priority Data

Sep. 14, 2007    (JP)    ............... 2007-239339

(51) Int. Cl.
*G02B 6/00* (2006.01)

(52) U.S. Cl. ........................ 385/135; 385/55

(58) Field of Classification Search ................... 385/135
See application file for complete search history.

(56) References Cited

U.S. PATENT DOCUMENTS

| | | | | |
|---|---|---|---|---|
| 4,820,007 A | * | 4/1989 | Ross et al. | 385/135 |
| 5,375,185 A | * | 12/1994 | Hermsen et al. | 385/135 |
| 5,553,186 A | * | 9/1996 | Allen | 385/135 |
| 5,802,237 A | * | 9/1998 | Pulido | 385/135 |
| 5,825,963 A | * | 10/1998 | Burgett | 385/135 |
| 5,896,486 A | * | 4/1999 | Burek et al. | 385/135 |
| 6,721,484 B1 | * | 4/2004 | Blankenship et al. | 385/135 |
| 6,856,748 B1 | * | 2/2005 | Elkins et al. | 385/135 |
| 7,578,626 B2 | * | 8/2009 | Kawasaki et al. | 385/96 |
| 2009/0238523 A1 | * | 9/2009 | Honma et al. | 385/96 |

FOREIGN PATENT DOCUMENTS

JP    2005-025132    1/2005

\* cited by examiner

*Primary Examiner*—Charlie Peng
*Assistant Examiner*—Eric Wong
(74) *Attorney, Agent, or Firm*—Knobbe Martens Olson & Bear LLP

(57) ABSTRACT

To provide an optical connector kit in which all connector parts contained in a containing case, wherein said connector parts includes a ferrule equipped with an optical fiber employed, in which a short length optical fiber is fixed to the ferrule and the ferrule is subjected to polishing at the terminal end thereof in advance. The optical connector kit, wherein said kit comprises a ferrule with an optical fiber comprising a short length optical fiber which has been fixed to the ferrule in advance, in which the ferrule is subjected to polishing treatment at the terminal surface thereof; a plurality of connector parts which are passed through said optical fiber before the rear end of said short length optical fiber and the front end of another optical fiber are subjected to fusion splice each other; and a containing case for receiving all connector parts constructing an optical connector including said ferrule with the optical fiber and said passing parts. Said containing case can hold one part of said connector parts while in the condition where the other part of said connector parts used to said fusion splice including said ferrule with the optical fiber and said passing parts can be taken out of said case.

1 Claim, 11 Drawing Sheets

OPTICAL CONNECTOR KIT

CROSS-REFERENCE TO RELATED APPLICATIONS

This application claims priority to and the benefit of Japanese Patent Application No. 2007-239339, filed on Sep. 14, 2007, in the Japan Patent Office, the disclosure of which is incorporated herein in its entirety by reference.

BACKGROUND OF THE INVENTION

1. Field of the Invention

The present invention relates to an optical connector kit comprising all parts for an optical connector which facilitates the operation performance for fixing an optical connector to the front end of an optical fiber in an operation site where the operation performance is more restricted than that in a manufacturing factory.

2. Description of the Related Technology

In recent years, the requirement that an optical connector is fixed to the front end of an optical fiber in an operation site where the operation performance is more restricted than that in a manufacturing factory in order to realize a construction of an access network by optical fibers or a local optical fiber distribution has been increased.

In general, an optical connector comprises a lot of parts and, firstly, these necessary connector parts are required to manually pass through the optical fiber one by one during the fixation of the optical connector to the front end of the optical fiber.

When, in particular, the fixation operation is carried out in the operation site, therefore, there tends to cause working errors such as some connector parts are forgotten to pass through the optical fiber, some connector parts are passed through the optical fiber in wrong order or wrong orientations which will lead the workability deteriorated since the operation to pass the connector parts through the optical fiber takes a long time is even though such a fixation operation is simple.

Conventionally, to solve such problems in above, it has been proposed that a plurality of connector parts to be passed through the optical fiber prior to the optical connector is fixed to the front end of the optical fiber are contained in a case in sequential order to pass thereof (See, for example, Japanese Patent Application Laid-Open Publication No. 2005-25,132).

It is expected to obviate such working errors occurred that some connector parts are forgotten to pass through the optical fiber or some connector parts are passed through the optical fiber in wrong order or wrong orientations by using such an optical connector parts case.

In such a conventional optical connector parts case described in above, however, a ferrule which is an essential connector part for fixing the optical connector to the front end of the optical fiber is not included. In other words, this case is not for containing all necessary connector parts for constructing the optical connector.

Moreover, the workability when using the above optical connector case is bad since required connector parts are need to be passed through the optical fiber in advance as well as the coating of the optical fiber must be removed at the front end of the fiber to insert and adhere to a ferrule that is separately prepared during the assembly of the optical connector by employing the above optical connector case in the operation site, which takes a long time.

SUMMARY

Under the circumstances, one aspect of the present invention has been made to solve the above mentioned problems. One embodiment employs a ferrule equipped with an optical fiber in which a short length optical fiber is previously fixed to the ferrule and subjected to polishing at the terminal surface thereof. An aspect of the invention is to provide an optical connector kit having a case containing all connector parts comprising the optical connector including the ferrule equipped with the optical fiber in above.

According to one aspect of the present invention, there is provided an optical connector kit, wherein said kit comprises: a ferrule with an optical fiber comprising a short length optical fiber which has been fixed to the ferrule in advance, in which the ferrule is subjected to polishing treatment at the terminal surface thereof; a plurality of connector parts (passing parts) which are passed through said optical fiber before the rear end of said short length optical fiber and the front end of another optical fiber are subjected to fusion splice each other; and a containing case for receiving all connector parts constructing an optical connector including said ferrule with the optical fiber and said passing parts, wherein, said containing case can hold one part of said connector parts while in the condition where the other part of said connector parts used to said fusion splice (parts for fusion splice) including said ferrule with the optical fiber and said passing parts can be taken out of said case.

According to another aspect of the present invention, there is provided the optical connector kit as set forth above, wherein said containing case has the upper and the lower housings, in which said both housings are configured such that they can be opened and closed, wherein said upper housing is configured such that its different states including at least a partial open state where said upper housing opens a receiving region of said parts for fusion splice of said lower housing and a full-open state where said upper housing opens all region of said lower housing, that is, two-step open states can be switched.

According to yet another aspect of the present invention, there is provided the optical connector kit as set forth above, wherein said ferrule with the optical fiber is contained in said containing case while said ferrule with the optical fiber is fixed to a holding member which holds said ferrule with the optical fiber during said fusion splice.

According to yet another aspect of the present invention, there is provided the optical connector kit as set forth above, wherein said containing case includes a ferrule with the optical fiber receiving part for receiving said ferrule with the optical fiber fixed to said holding member, wherein said ferrule with the optical fiber receiving part has an optical fiber protection part which forms a space around the periphery of the optical fiber portion extending and projecting from the rear end of said ferrule when said ferrule with the optical fiber is contained therein.

According to yet another aspect of the present invention, there is provided the optical connector kit as set forth above, wherein said containing case includes a holding member receiving part for receiving said holding member fixed to said ferrule with the optical fiber, wherein said holding member receiving part has a finger receiving part in which a finger is placed when said holding member contained in said holding member receiving part is taken out.

According to yet another aspect of the present invention, there is provided the optical connector kit as set forth above, wherein said passing parts are contained in said containing case while said passing parts are in the condition where said passing parts are aligned in one line following to their passing orders.

According to yet another aspect of the present invention, there is provided the optical connector kit as set forth above, wherein said containing case includes an passing parts receiving part for receiving said passing parts aligned in one line following to their passing order, wherein optical fiber insert openings are provided at both side walls of said containing case on an extension line from said passing parts receiving part through which said optical fiber is possible to pass from one outer side of said containing case to the other side wall of said containing case via said passing parts.

According to yet another aspect of the present invention, there is provided the optical connector kit as set forth above, wherein said containing case includes an other part receiving part for receiving said other part of said connector parts, wherein said other part receiving part has a finger receiving part for placing a finger on said other part of said connector parts when said other part of said connector parts contained in said other part receiving part is taken out.

According to yet another aspect of the present invention, there is provided the optical connector kit as set forth above, wherein said containing case is comprised by a lower housing having the bottom surface that is raised by the peripheral side wall of said lower housing and an upper housing having the lid surface that is raised by the peripheral side wall of said upper housing, in which both lower and upper housings are coupled with each other so as to be opened and closed, said lower housing including a flange around the lower periphery of said side wall and said upper housing including a flange around the lower periphery of said side wall, wherein when said containing case is closed so as to the lower surface of said flange of said upper housing is overlapped with the upper surface of said flange of said lower housing, said side wall of said lower housing and said side wall of said upper housing are tightly contacted with each other to maintain said containing case closed.

According to yet another aspect of the present invention, there is provided the optical connector kit as set forth above, wherein a tab is provided to each of one part of said flange of said lower housing and one part of said flange of said upper housing, each of said tabs being off-lined and overlapped with each other while said containing case is closed to provide a grasping portion to open said containing case.

According to yet another aspect of the present invention, there is provided the optical connector kit as set forth above, wherein said containing case includes a first region for receiving said parts for fusion splice at a side apart from the coupling portion of said lower and upper housings and a second region for receiving said other parts of said connector parts at a side closed to said coupling portion.

According to yet another aspect of the present invention, there is provided the optical connector kit as set forth above, wherein, a ferrule with the optical fiber receiving part for receiving said ferrule with the optical fiber; an passing parts receiving part for receiving said passing parts aligned in one line following to their passing orders; and a reinforcing sleeve receiving part for receiving a reinforcing sleeve that reinforces the fusion splice portion while the rear end of said short length optical fiber is fused to splice to the front end of said optical fiber are placed in said first region.

According to yet another aspect of the present invention, there is provided the optical connector kit as set forth above, wherein said reinforcing sleeve receiving part has a finger receiving part in which a finger is placed while said reinforcing sleeve contained in said reinforcing sleeve receiving part is taken out.

According to yet another aspect of the present invention, there is provided the optical connector kit as set forth above, wherein said other parts receiving part for containing said other parts of said connector parts is placed in said second region.

According to yet another aspect of the present invention, there is provided the optical connector kit as set forth above, wherein said upper housing is configured to be foldable at the boundary between said first and said second regions.

According to yet another aspect of the present invention, there is provided the optical connector kit as set forth above, wherein said containing case includes a lower engagement part and an upper engagement part for engaging said second regions of said lower housing and said upper housing with each other, wherein said lower and upper engagement parts are in the engagement state thereof while said containing case is closed as well as said engagement state is still maintained when said upper housing is opened to said partial open state, while the engagement of said engagement state is released when said upper housing is opened to said full-open state, thereby providing said full-open state.

According to yet another aspect of the present invention, there is provided the optical connector kit as set forth above, wherein the height between said flange and said bottom surface of said lower housing and the height between said flange and said lid surface of said upper housing are substantially equal, wherein said ferrule with the optical fiber receiving part, said passing parts receiving part, said reinforcing sleeve receiving part and said other parts receiving part are formed to said bottom surface of said lower housing such that any of said receiving parts are downwardly expanded from said bottom surface of said lower housing.

According to yet another aspect of the present invention, there is provided the optical connector kit as set forth above, wherein said ferrule with the optical fiber comprises said short length optical fiber that is coated by a metal or carbon coating around the periphery thereof and fixed to said ferrule as it is.

According to yet another aspect of the present invention, there is provided the optical connector kit as set forth above, wherein said ferrule with the optical fiber is comprised by that said short length optical fiber having a bare optical fiber portion in which a coating of said fiber is removed at the front end thereof is fixed to said ferrule having a capillary and a flange part for holding the rear end of said capillary, wherein a fine hole for receiving said bare optical fiber portion of said short length optical fiber and a coated portion receiving hole for receiving one coated optical fiber portion following to said bare optical fiber portion are formed to said capillary such that both holes are aligned from the front end to the rear end, respectively, as well as the length of said fine hole is shorter than that of said coated optical fiber portion receiving hole.

According to aspects of the present invention, an optical connector kit, wherein the kit comprises a ferrule with an optical fiber including a short length optical fiber which has been fixed to the ferrule in advance, in which said ferrule is subjected to a polishing treatment at the terminal surface thereof; a plurality of connector parts (passing parts) which are passed through said optical fiber before the rear end of said short length optical fiber and the front end of another optical fiber are subjected to fusion splice with each other; and a containing case for receiving all connector parts constructing an optical connector including said ferrule with the optical fiber and said passing parts, wherein said containing case can hold one parts of said connector parts while the other parts of said connector parts used to said fusion splice (parts for fusion splice) including said ferrule with the optical fiber and said passing parts, whereby the kit is convenient to carry to a site of an operation as well as there is no worry to forget to bring any connector parts constructing the optical connector.

Furthermore, one aspect of the present invention facilitates the operation of fusion splice in which the rear end of the short length optical fiber and the front end of the optical surface are subjected to fusion splice with each other on-site since the ferrule with the optical fiber in which the short length optical fiber is fixed to the ferrule and the ferrule is subjected to a polishing treatment in advance is employed.

Yet further, there is no fear that the other connector parts after the completion of the fusion splice operation is out of the case to lose during the fusion splice operation since the containing case can hold one parts of said connector parts while the other parts of said connector parts are used in said fusion splice.

DETAILED DESCRIPTION OF CERTAIN INVENTIVE EMBODIMENTS

Figure 1:
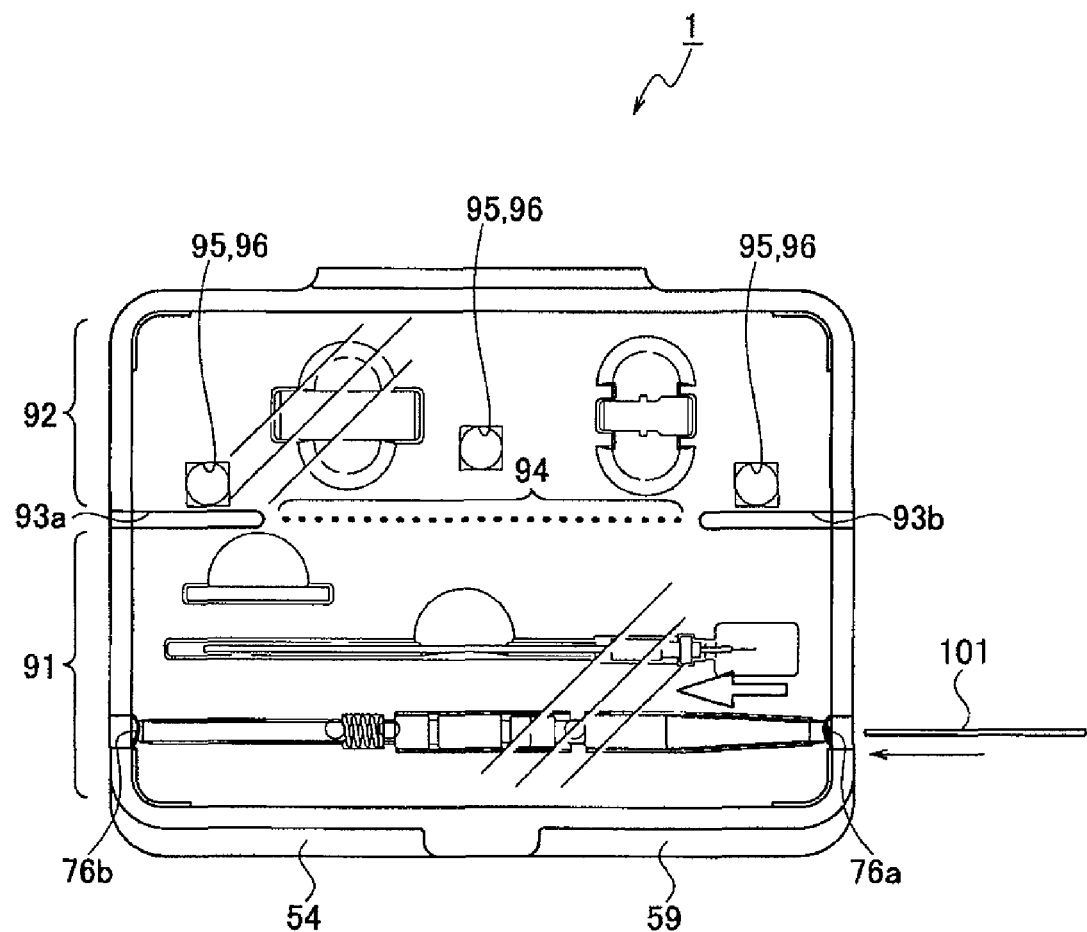
FIG. 1 is a plan view illustrating one embodiment of the optical connector kit, wherein all connector parts are contained in the containing case and it is in the closed state.
Figure 2:
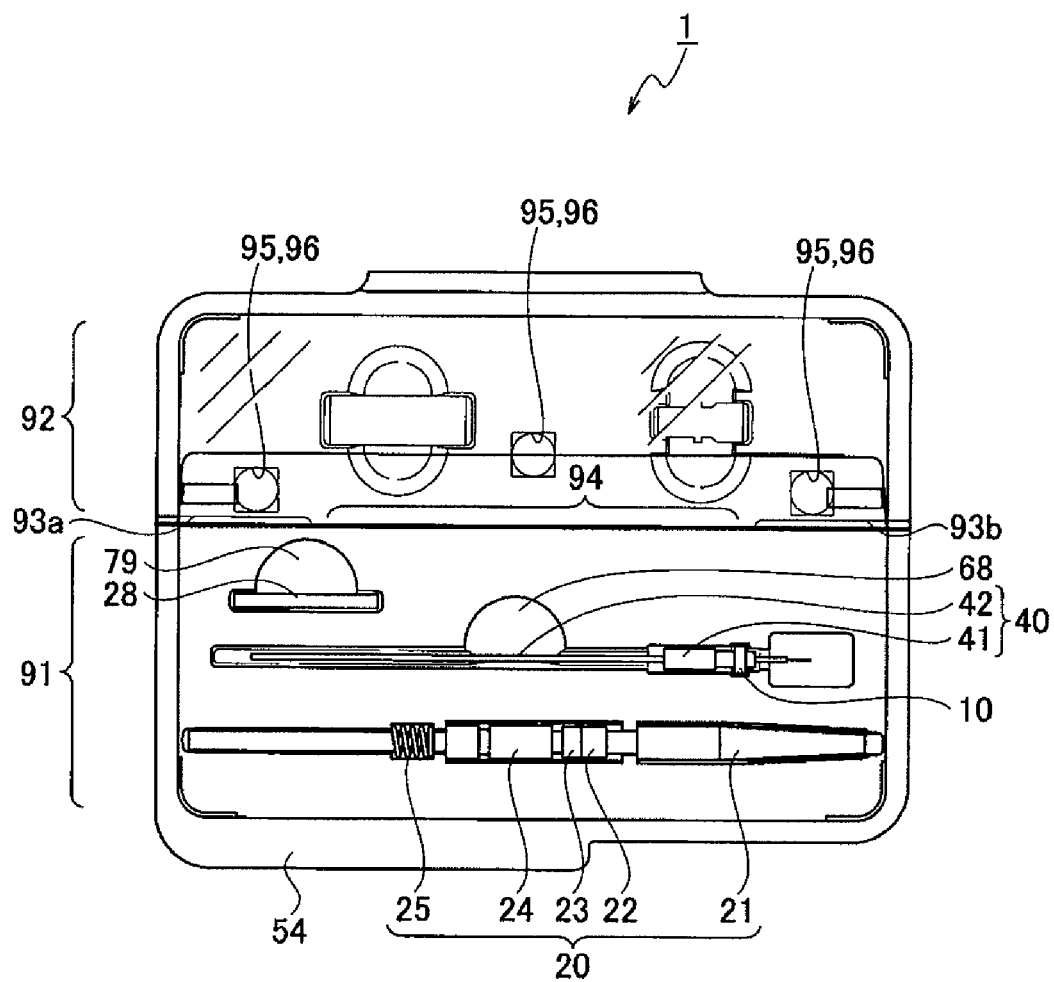
FIG. 2 is a plan view illustrating the optical connector kit of FIG. 1 being opened to the partial open state.
Figure 3:
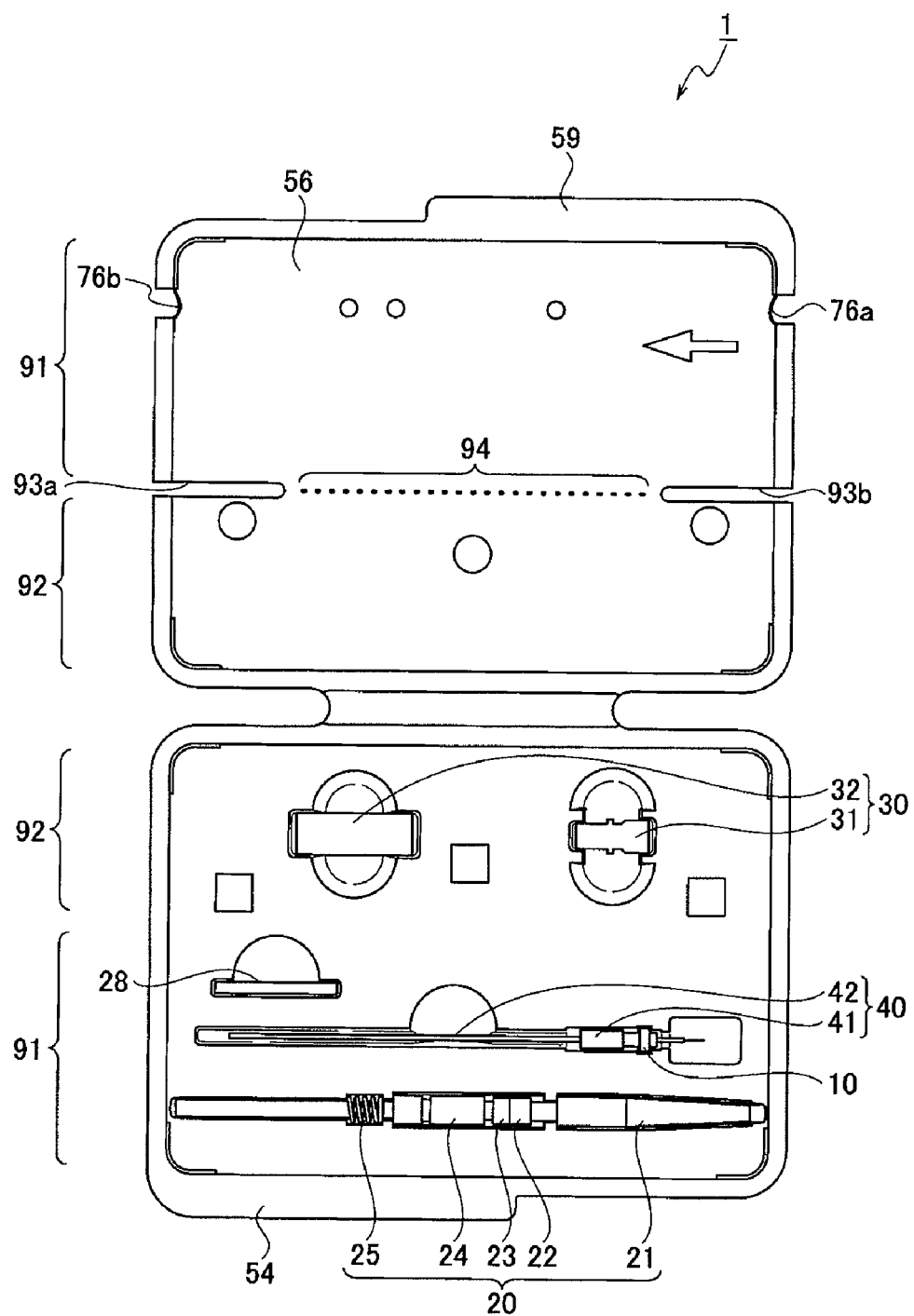
FIG. 3 is a plan view illustrating the optical connector kit of FIG. 1 being opened to the full-open state.
Figure 4:
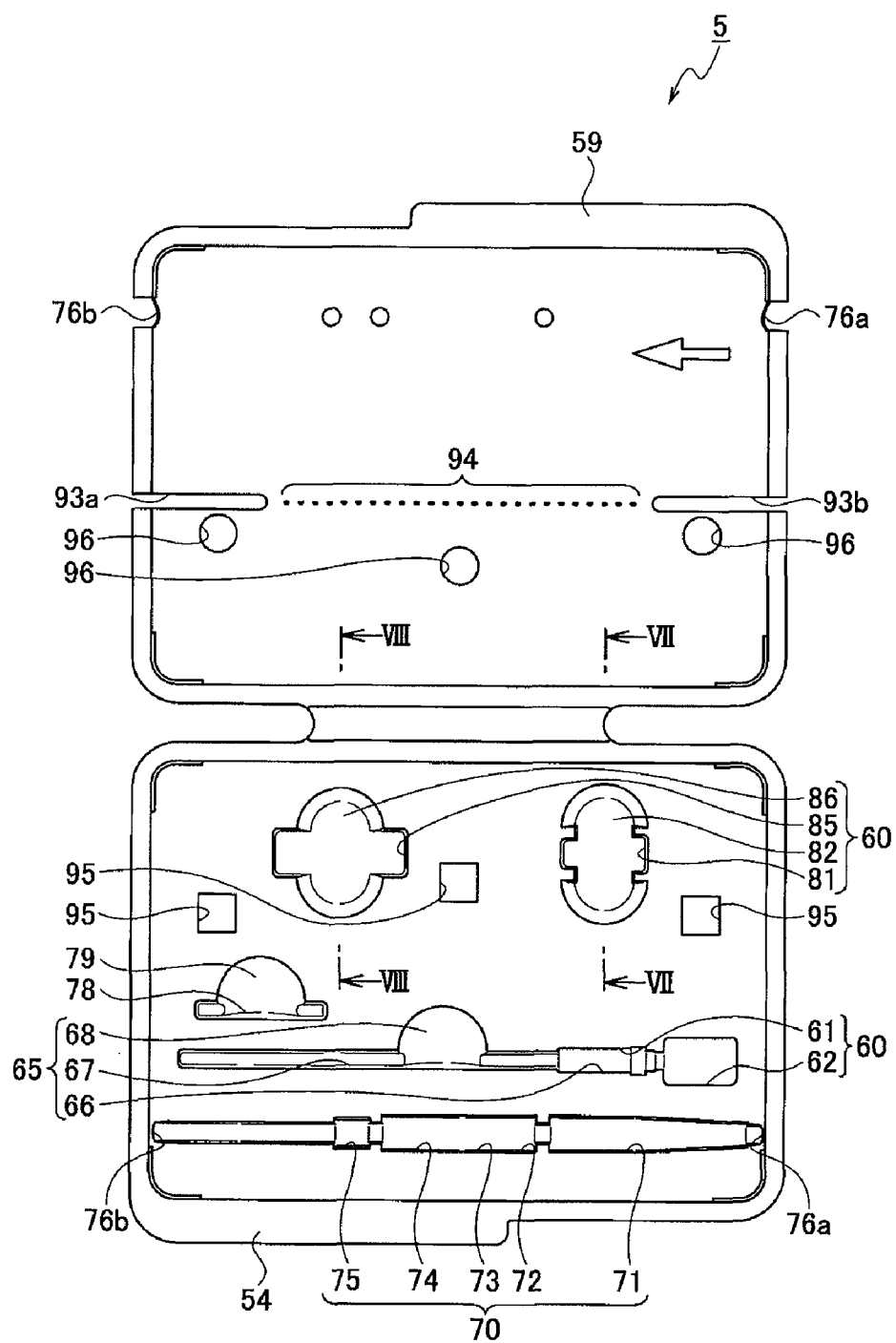
FIG. 4 is a plan view illustrating the containing case being in the full-open state, in which no connector part is contained therein at all, that is the containing case is empty.
Figure 5:
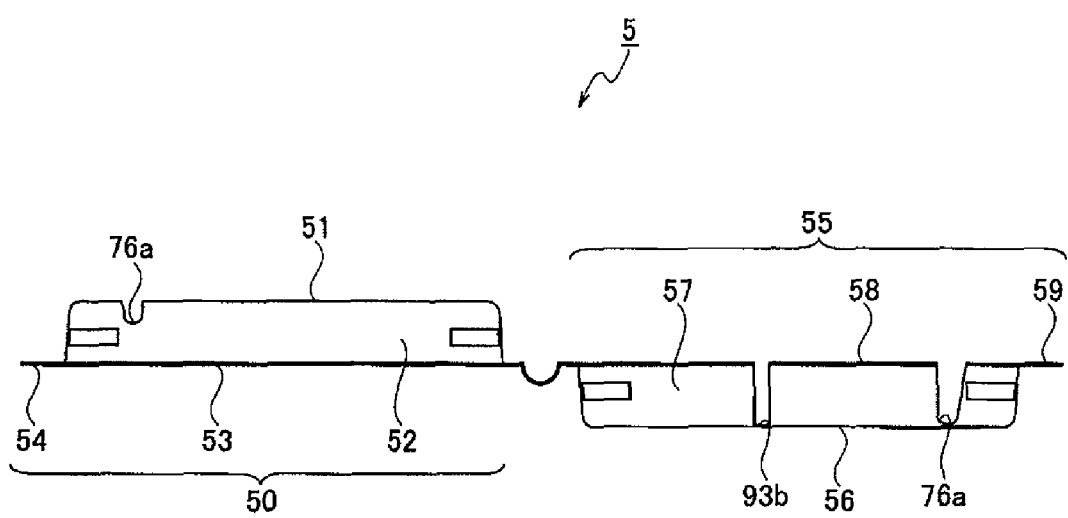
FIG. 5 is the right side view of the containing case of FIG. 4.
Figure 6:
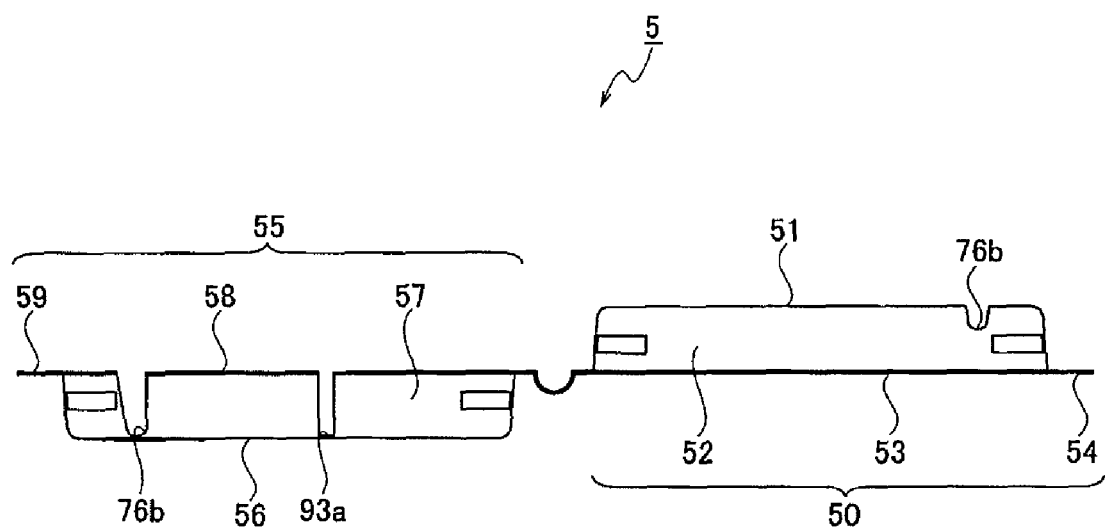
FIG. 6 is the left side view of the containing case of FIG. 4.
Figure 7:
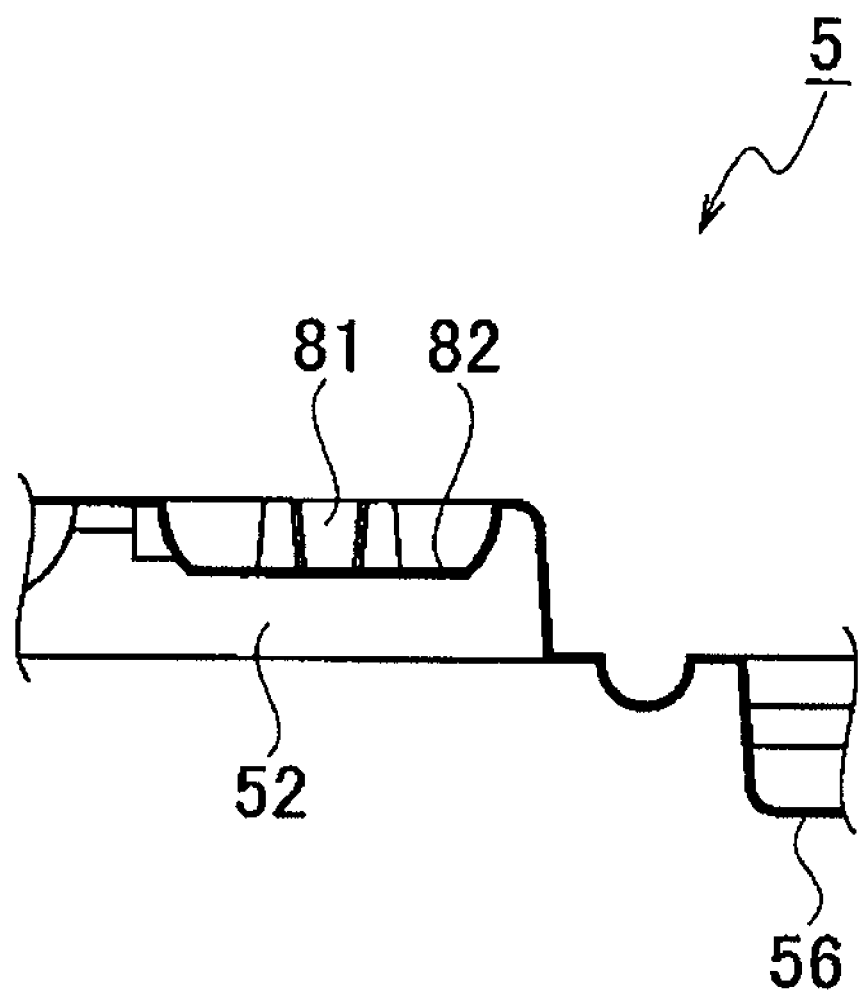
FIG. 7 is a cross sectional view of the important portion of the containing case of FIG. 4 along with the line VII-VII.
Figure 8:
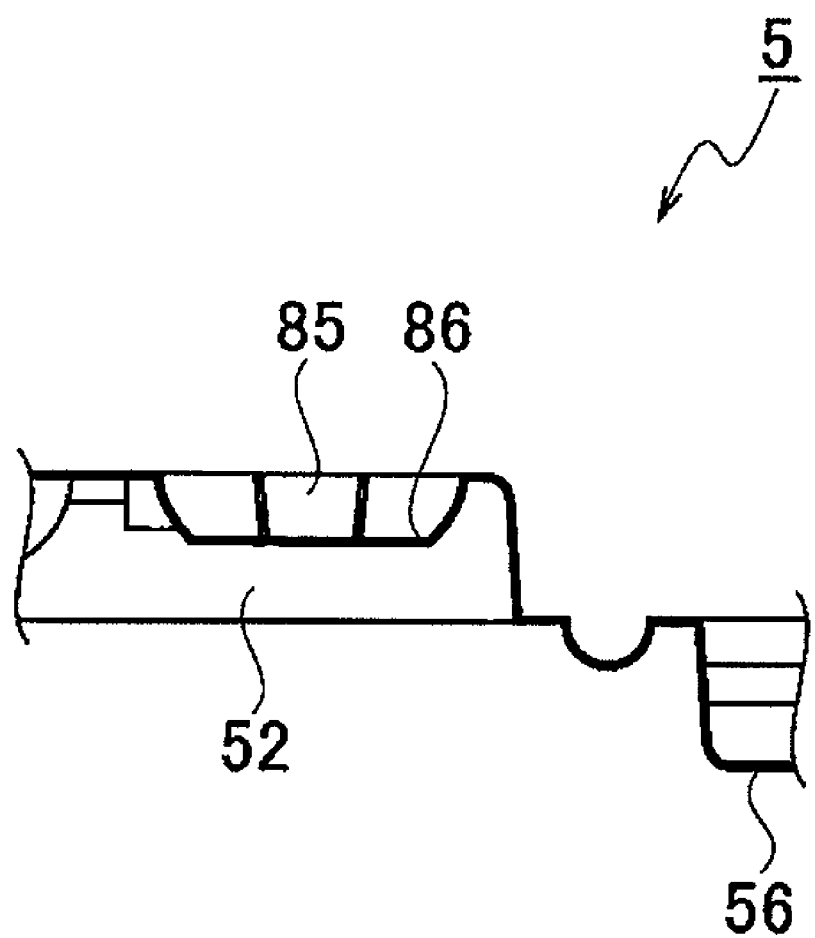
FIG. 8 is a cross sectional view of the important portion of the containing case of FIG. 4 along with the line VIII-VIII.

Certain embodiments will now be explained with the reference to the drawings in below. The drawings show one embodiment of the optical connector kit: FIG. 1 is a plane view illustrating the containing case containing all connector parts therein in the closed state; FIG. 2 is a plane view illustrating the containing case in the state where the containing case is opened to the partial open state; FIG. 3 is a plane view illustrating the containing case in the state where the containing case is opened to the full-open state; and FIG. 4 is a plane view illustrating the containing case containing no connector parts at all therein, that is, it is empty, the containing case being in the state where it is opened to the full-open state.

An optical connector kit 1 comprises a containing case 5 containing all connector parts to construct an optical connector including a ferrule with an optical fiber 10, wherein a short length optical fiber is fixed to the ferrule and the ferrule is subjected to polishing treatment in advance.

Figure 9:
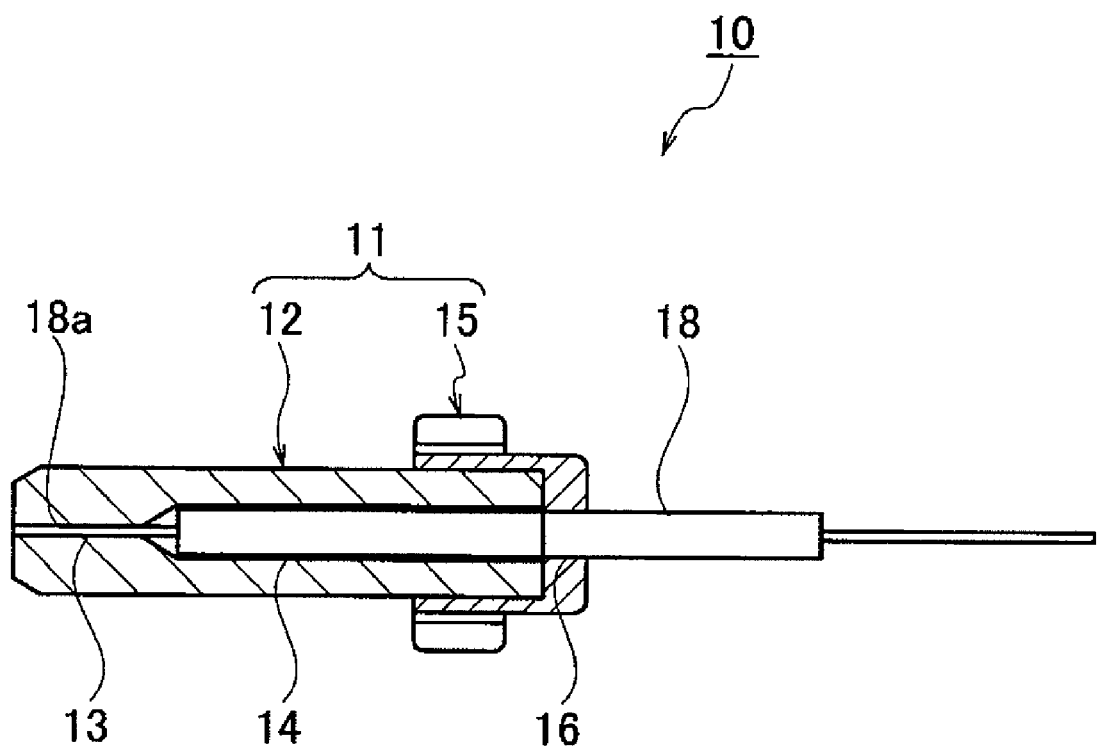
FIG. 9 is a cross sectional view illustrating one embodiment of the ferrule with the optical fiber used in the optical connector kit.

As shown in FIG. 9, the ferrule with the optical fiber 10 comprises a ferrule 11 including a capillary 12 and a flange 15 that holds the rear end of the capillary 12. To this ferrule 11, a short length optical fiber 18 having a bare optical fiber portion 18a prepared by removing the coating therefrom at the front end is fixed and the ferrule 11 is subjected to polishing treatment.

The capillary 12 has a fine hole 13 for receiving the bare optical fiber portion 18a of the short length optical fiber 18 and a coated portion receiving hole 14 for receiving one portion of a coated optical fiber portion 18b following to the bare optical fiber portion 18a (see FIG. 10) formed at the front end portion and the rear end portion, respectively. Also, these holes are formed such that the length of the fine hole 13 is shorter than that of the coated portion receiving hole 14.

A flange part 15 is provided with a coated portion through hole 16 for passing through a micro-length portion of the coated optical fiber 18b following to the portion to be received by the coated portion receiving part 14 for the coated optical fiber 18b.

When the bare optical fiber portion 18a is received in and fixed to the fine hole 13 of the capillary 12 and one portion of the coated optical fiber 18b following to the bare optical fiber portion 18a is received in and fixed to the coated portion receiving hole 14 of the capillary 12, the short length optical fiber 18 is backwardly extended out of the coated part through hole 16 of the flange 15 by the required excess length for splice 18c.

The required excess length for splice 18c backwardly extending out of the flange 15 has at least a length required by a not shown fusion splicer which optically connects the rear end of this required excess length for splice 18c and the front end of another optical fiber 101 (see FIG. 1) to be connected to that rear end.

Figure 10:
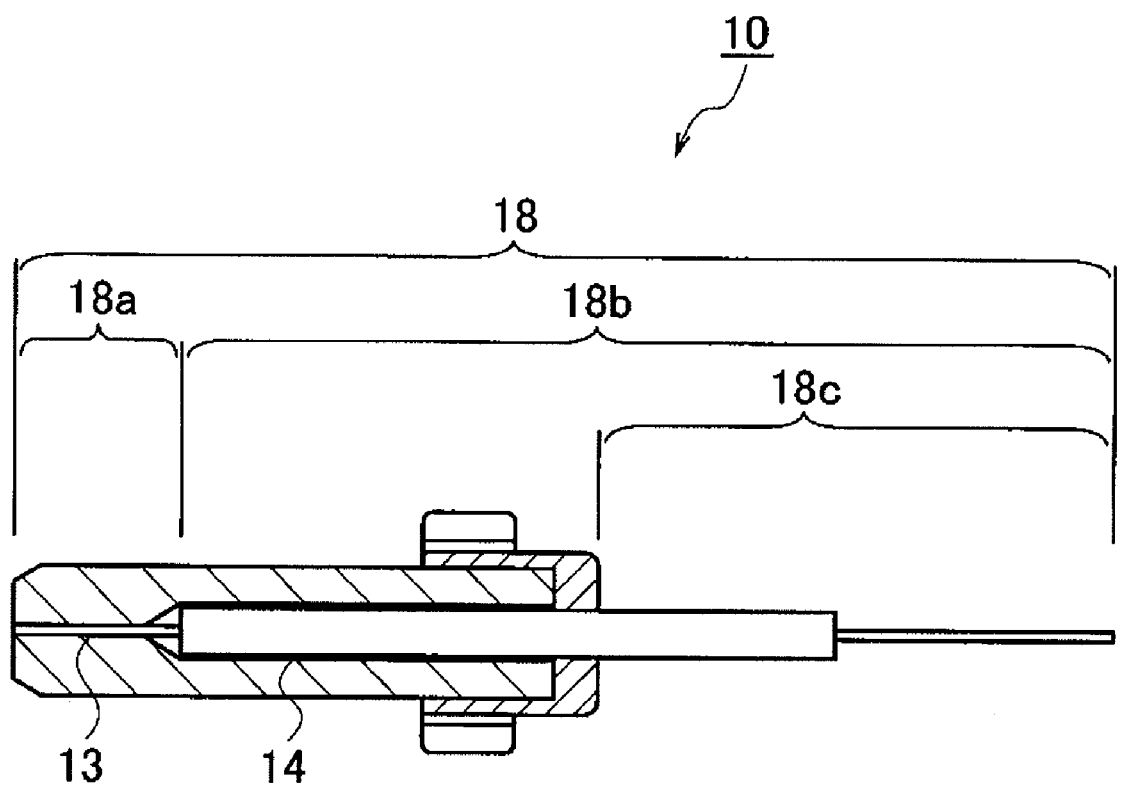
FIG. 10 is a cross sectional view illustrating each length of respective parts of the short length optical fiber used in the ferrule with the optical fiber of FIG. 9.

Although the excess length for splice 18c of the short length optical fiber 18 may be remained to be the coated optical fiber portion 18b, the coating thereof may be removed at the rear end portion as shown in FIGS. 9 and 10.

As a counter plan against the deterioration in strength during a long term storage of the short length optical fiber 18 at a room temperature or as an improvement of the static fatigue characteristics thereof when it is contained in the optical connector kit 1, it is preferred that the short length optical fiber 18 is coated with a metal or a carbon coatings, that is, a hermetic coating such as a metal coat or a carbon coat provided to the periphery thereof.

Connector parts constructing an optical connector include, other than such a ferrule with an optical fiber, a plurality of connector parts 20 through which the optical fiber 101 is inserted (passing parts) before the rear end of the short length optical fiber 18 and the front end of the optical fiber 101 are subjected to fusion splice with each other.

In other word, the passing parts 20 include, as shown in FIG. 3, a boot 21, a sleeve 22, an adaptor 23, stopring 24 and a spring 25. A reinforcing sleeve 28 is added to the ferrule with the optical fiber 10 and the passing parts 20, which provides connector parts to be used for the fusion splice (parts for fusion splice).

The reinforcing sleeve 28 provides reinforcement to the fusion splice portion when the rear end of the short length optical fiber 18 and the front end of the optical fiber 101 are subjected to fusion splice. Therefore, the reinforcing sleeve 28 is comprised by a heat-shrinkable tubing including a reinforcing member such as a metal and a thermoplastic resin.

Also, the connector parts constructing the optical connector include the other connector parts 30 (other parts) other than the fusion splice parts 10, 20 and 28. That is, the other connector parts (other parts) 30 include a plug frame 31 and a holder 32 as shown in FIG. 3.

A containing case 5 for containing all connector parts constructing an optical connector as described in above also contains a holding member 40 that holds the ferrule with the optical fiber 10 during the fusion splice.

The holding member 40 includes a cap 41 from which the ferrule 11 of the ferrule with the optical fiber 10 is inserted and a pull-up member 42 extended from the bottom of the cap 41. The holding member 40 is integrated with the ferrule with the optical fiber 10 upon the ferrule 11 is inserted from the cap 41.

As shown in FIGS. 4 to 8, the containing case is configured such that a lower housing 50 having the bottom surface 51 raised by the peripheral side wall 52 and an upper housing 55 having the lid surface 56 raised by the peripheral side wall 57, wherein both housings are coupled with each other so as to be possible to open and close.

The lower housing 50 includes a flange 53 provided to the lower periphery of the side wall 52 and the upper housing 55 includes a flange 58 provided to the lower periphery of the side wall 57. The containing case 5 is maintained closed by tightly contacting the side wall 52 of the lower housing 50 and the side wall 57 of the upper housing 55 when the containing case 5 is closed until the lower surface of the flange 58 of the upper housing 55 is overlapped with the upper surface of the flange 53 of the lower housing 50.

The containing case 5 includes tabs 54 and 59 provided to each of one part of the flange 53 of the lower housing 50 and one part of the flange 58 of the upper housing 55, respectively, to open the containing case 5 by grasping those tabs overlapped with but off lined each other when the containing case 5 is closed.

The height between the bottom surface 51 and the flange 53 of the lower housing 50 and the height between the lid surface 56 and the flange 58 of the upper housing 55 are formed so as to be substantially the same.

Further, to the containing case 5, a ferrule with the optical fiber receiving part 60 for receiving the ferrule with the optical fiber 10, a holding member receiving part 65 for receiving the holding member 40 fixed to the ferrule with the optical fiber receiving part 60, a passing parts receiving part 70 for receiving the passing parts 20 each aligned following to their passing order, a reinforcing sleeve receiving part 78 for receiving the reinforcing sleeve 28, and an other parts receiving part 80 for receiving the other connector parts (other parts) 30 are provided at and downwardly expanded from the bottom surface 51 of the lower housing 50.

The ferrule with the optical fiber receiving part 60 includes a ferrule receiving part 61 for receiving the ferrule 11 of the ferrule with the optical fiber 10 and an optical fiber protection part 62 that forms a space around the periphery of the optical fiber portion (excess length for splice) 18c which extends from the rear end of the ferrule 11 when the ferrule is received in the ferrule receiving part 61.

By this optical fiber protection part 62, the excess length for splice 18c which is not protected for its strength at all because it is extended out of the rear end of the ferrule 11 when the ferrule with the optical fiber 10 is received in the ferrule with the optical fiber receiving part 60 will be protected by the space as a barrier.

The holding member receiving part 65 includes a cap receiving part 66 for receiving the cap 41 of the holding member 40 into which the ferrule with the optical fiber 11 is inserted and the retracting part receiving part 67 for pulling up the pull-up part 42 extending from the bottom part of the cap 41.

Also, the holding member receiving part 65 has a finger receiving part used when a finger is put on the holding member 40 to take it out of the holding member receiving part 65. More specifically, the holding member 40 and the ferrule with the optical fiber 10 integrated therewith can be taken out of the containing case 5 by placing the finger into the finger receiving part 68 to pull up the pull-up part 42 of the holding member 40.

The passing parts receiving part 70 includes a boot receiving part 71 for receiving the boot 21, a sleeve receiving part 72 for receiving the sleeve 22, an adaptor receiving part 73 for receiving the adaptor 23, a stopring receiving part 74 for receiving the stopring 24 and a spring receiving part 75 for receiving the spring 25.

Moreover, the containing case 5 includes optical fiber through holes 76a and 76b provided to both side walls of the containing case 5 along the extension of the insert part receiving part 70, through which the optical fiber 101 can be passed from one outer side of the containing case 5 to the other outer side of the containing case 5 via the connector parts (passing parts) 20 (the boot 21, the sleeve 22, the adaptor 23, the stopring 24 and the spring 25) which are lined up and contained in the case.

The reinforcing sleeve receiving part 78 contains the reinforcing sleeve 28. Also, the reinforcing sleeve receiving part 78 has a finger receiving part 79 used when a finger is put on the contained reinforcing sleeve 28 to take it out of the reinforcing sleeve receiving member receiving part 78 containing thereof.

Specifically, the reinforcing sleeve 28 can be taken out of the containing case 5 by placing the finger into the finger receiving part 79 and pulling up the reinforcing sleeve 28.

The other parts receiving part 80 includes a plug frame receiving part 81 for receiving the plug frame 31 and a holder receiving part 85 for receiving the holder 32. Further, the plug frame receiving part 81 has a finger receiving part 82 used when a finger is put on the contained plug frame 31 to take it out of the plug frame receiving part 81 containing thereof.

Specifically, the plug frame 31 can be taken out of the plug frame receiving part 82 by placing the finger into the finger receiving part 82 and pulling up the plug frame 31.

Further, the holder receiving part 85 has a finger receiving part 86 used when a finger is put on the contained holder 32 to take it out of the holder receiving part 85 containing thereof. Specifically, the holder 32 can be taken out of the holder receiving part 85 by placing the finger into the finger receiving part 86 and pulling up the holder 32.

The containing case 5 as described in above may be molded with a proper synthetic resin such as PET (polyethylene terephthalate) resin and the like. In this case, when the containing case 5 is made so as to be transparent, all connector parts 10, 20, 28 and 30 contained in the inside of the case can be confirmed from the outside without opening the containing case 5.

The containing case 5 further includes, as shown in FIGS. 1 to 3, a first region 91 provided at a side apart from the coupling portion of the lower housing 50 and the upper housing 55, in which the parts for fusion splice 10, 20 and 28 are contained and a second region 92 provided at a side closed to the coupling portion, in which the other connector parts 30 are contained.

The upper housing 55 of the containing case 5 is configured such that it can be folded along the boundary portion between the first and the second regions 91 and 92. More specifically, to the predetermined position of the upper housing 55, notches 93a and 93b are formed from both side walls to one part of the lid surface 56, wherein multiple pores 94 connecting both notches 93a and 93b with each other are also provided.

Accordingly, the upper housing 55 can be folded along with the notches 93a and 93b and the multiple pores 94 to open only the first region 91.

Therefore, the containing case 5 is configured such that the lower housing 50 and the upper housing 55 can be opened, wherein the upper housing 55 is configured so as to be switched between a partial open state where the region for containing the parts for fusion splice of the lower housing 50 (the first region 91) is opened and a full-open state where all region of the lower housing 50 is opened.

The containing case 5 further includes a lower engagement part 95 and an upper engagement part 96 each can be engaged with the second region 92 of the lower housing 50 and the second region 92 of the upper housing 55, respectively (see FIGS. 1, 2 and 4).

The lower and the upper engagement parts 95 and 96 are in the condition of being engaged with each other when the containing case 5 is closed state (see FIG. 1), which is maintained until the upper housing 55 is opened to the partial open state (see FIG. 2), and the engagement is released to allow to open the case to the full-open state.

The containing case 5 may be configured so as to be switched among three or more different open states including the partial open state to open only the first region 91 and the full-open state to open any of the first and the second regions 91 and 92.

Next, a method for assembling an optical connector wherein the optical connector is assembled by using the above optical connector kit 1 will be explained in below.

At first, in the optical connector kit 1, the ferrule with the optical fiber 10 is contained in the ferrule with the optical fiber receiving part 60, the holding member 40 that is integrated with the ferrule with the optical fiber 10 is contained in the holding member receiving part 65, the passing parts 20 (the boot 21, the sleeve 22, the adaptor 23, the stopring 24 and the spring 25) are contained in the passing parts receiving part 70, the reinforcing sleeve 28 is contained in the reinforcing sleeve receiving part 78, and the other connector parts (other parts) 30 (the plug frame 31 and the holder 32) are contained in the other parts receiving part 80 (see FIGS. 3 and 4).

Then, the containing case 5 is closed until the lower surface of the flange 58 of the upper housing 55 is overlapped with the upper surface of the flange 53 of the lower housing 50 and the side wall 52 of the lower housing 50 and the side wall 57 of the upper housing 55 are tightly contacted with each other, whereby the containing case 5 can be maintained in the closed state thereof (see FIG. 1).

At that time, the lower engagement part 95 provided to the second region 92 of the lower housing 50 and the upper engagement part 96 provided to the second region 92 of the upper housing 55 are in the condition where they are engaged with each other.

In the closed state of the containing case 5 as described in above, the optical fiber 101 is inserted into the inside of the containing case 5 from the optical fiber through hole 76a near the rear end of the boot 21 and projected to the outside of the containing case 5 from the optical fiber through hole 76b at the opposite side. As a result thereof, the optical fiber 101 will be inserted through the passing parts 20 which have been lined up and contained in the containing case 5 following to the insert order thereof (in order of the boot 21, the sleeve 22, the adaptor 23, the stopring 24 and the spring 25).

Next, the upper housing 55 is pulled up by placing a finger on the tabs 54 and 59 of the containing case 5. At that time, the upper housing 55 can be held such that the portion of the second region 92 thereof is not be pulled up since the containing case 5 is in the condition where the upper engagement part 96 provided to the second region 92 of the upper housing is engaged with the lower engagement part 95 provided to the second region 92 of the lower housing 50.

Then, the upper housing 55 is folded along the notches 93a and 93b of the boundary between the first and the second regions 91 and 92 and the multiple pores 94 by the balance force between the force to raise up the tab 59 by placing a finger thereon and the force to hold the case so as not to raise up the upper housing 55. Therefore, in the containing case 5, the first regions 91 are opened while the second regions 92 are maintained closed (see FIG. 2).

Accordingly, the parts for fusion splice 10, 20 and 28 placed in the first region 91 of the lower housing 50 can be taken out of the containing case 5 while the rest other connector parts 30 placed in the second region 92 are still held in the containing case 5 which is in the closed state.

And then, the ferrule with the optical fiber 10 integrated with the holding member 40 is taken out of the containing case 5 and the rear end of the short length optical fiber 18 of the ferrule with the optical fiber 10 is fused to splice to the front end of the optical fiber 101 by using a proper fusion splicer.

This fusion splice is followed, firstly, to that the coating of the rear end required length portion of the excess length for splice 18c of the short length optical fiber 18 and the coating of the front end required length portion of the optical fiber 101 are removed, and secondary, to that the rear end of the short length optical fiber 18 and the front end of the optical fiber 101 are opposed to each other to adjust centers thereof with the position of the core or the clad as a reference.

In this case, the operation time can be shortened when the coating of the rear end required length portion of the excess length for splice 18c of the short length optical fiber 18 is previously removed off to skip the operation of removing the coating. And, then, the fusion slice portion is reinforced by mounting the reinforcing sleeve 28 that is comprised by the heat-shrinkable tubing including a reinforcing member such as a metal and a thermoplastic resin.

After that, the upper housing 55 of the containing case 5 is further pulled up to release the engagement of the upper and the lower engagement parts 96 and 95 to open the second regions 92 (see FIG. 3). Accordingly, the other the connector parts (other parts) 30 placed in the second region 92 of the lower housing 50 can be taken out of the containing case 5.

Figure 11:
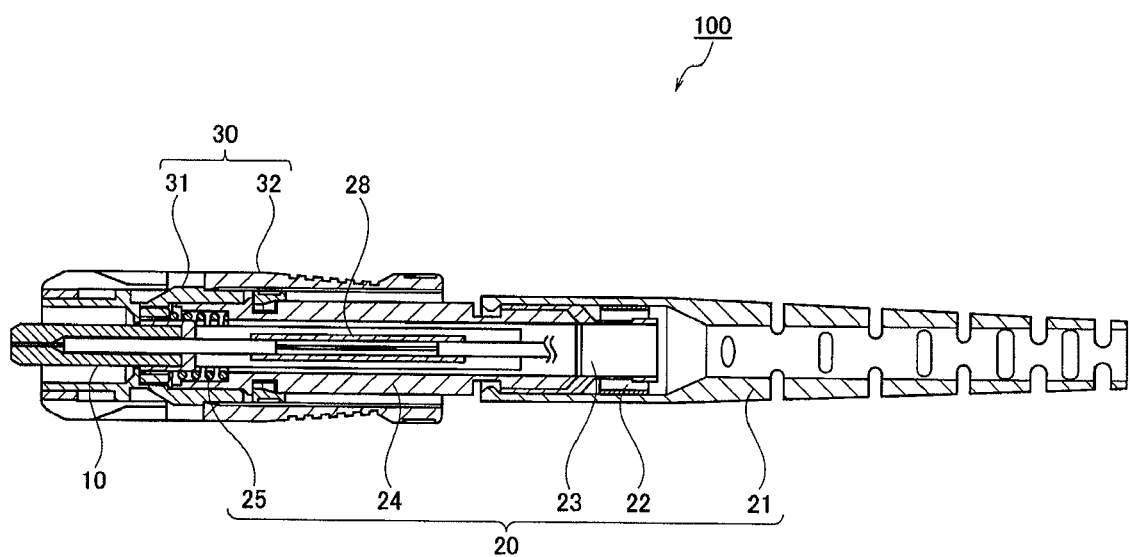
FIG. 11 is a cross sectional view illustrating an optical connector kit assembled according to one embodiment.

Then, the passing parts 20 (the boot 21, the sleeve 22, the adaptor 23, the stopring 24 and the spring 25) through which the optical fiber 101 is inserted and the other connector parts (other parts) 30 (the plug frame 31 and the holder 32) are assembled according to the predetermined assembling order. As a result, the optical connector 100 can be provided as shown in FIG. 11.

Although the optical connector kit of embodiment has been explained in detail together with the method for assembling the optical connector using the same, the present invention is not intended to restrict to the embodiment in above and various modifications can be made to thereto.

For example, any conventional mechanisms well known in the art such as a hinge type and a fitting type may be employed as the open-close mechanism for the lower and the upper housings of the containing case 5. Also in this case, the partial open and the full-open states of the containing case 5 can optionally be realized.

Though the embodiment in above has been explained for a SC type connector parts as an example, the embodiment can also be applied to a MU type, FC type, ST type and so on.

What is claimed is:

1. An optical connector kit, comprising:
   a ferrule with an optical fiber comprising a short length optical fiber which has been fixed to the ferrule in advance, in which the ferrule is subjected to polishing treatment at the terminal surface thereof;
   a plurality of passing parts which are passed through another optical fiber before the rear end of said short length optical fiber and the front end of said another optical fiber are subjected to fusion splice each other; and
   a containing case for receiving all connector parts constructing an optical connector including said ferrule with the optical fiber and said passing parts,
   wherein said containing case can hold one part of said connector parts while in the condition where the parts for fusion splice including said ferrule with the optical fiber and said passing parts can be taken out of said case,
   wherein said containing case has an upper and a lower housings, in which said both housings are configured such that they can be opened and closed, wherein said upper housing is configured such that its different states including at least a partial open state where said upper housing opens a receiving region of said parts for fusion splice of said lower housing and a full-open state where said upper housing opens all region of said lower housing, or two-step open states, can be switched,
   wherein said containing case is comprised by said lower housing having a bottom surface that is raised by the peripheral side wall of said lower housing and said upper housing having a lid surface that is raised by the peripheral side wall of said upper housing, in which both lower and upper housings are coupled with each other so as to be opened and closed,
   wherein said lower housing including a flange around the lower periphery of said side wall; and
   said upper housing including a flange around the lower periphery of said side wall,
   wherein when said containing case is closed so as to the lower surface of said flange of said upper housing is overlapped with the upper surface of said flange of said lower housing, said side wall of said lower housing and said side wall of said upper housing are tightly contacted with each other to maintain said containing case closed,
   wherein said containing case includes a first region for receiving said parts for fusion splice at a side apart from the coupling portion of said lower and upper housings and a second region for receiving said other parts of said connector parts at a side closed to said coupling portion,
   wherein said containing case includes a lower engagement part and an upper engagement part for engaging said second regions of said lower housing and said upper housing with each other,
   wherein said lower and upper engagement parts are in the engagement state thereof while said containing case is closed as well as said engagement state is still maintained when said upper housing is opened to said partial open state, while the engagement of said engagement state is released when said upper housing is opened to said full-open state, thereby providing said full-open state.

* * * * *